(12) United States Patent
Rose et al.

(10) Patent No.: US 6,197,196 B1
(45) Date of Patent: Mar. 6, 2001

(54) TREATMENT OF WATER

(75) Inventors: Peter Dale Rose; Oliver O'Connor Hart, both of Grahamstown (ZA)

(73) Assignee: Water Research Commission, Pretoria (ZA)

( * ) Notice: Subject to any disclaimer, the term of this patent is extended or adjusted under 35 U.S.C. 154(b) by 0 days.

(21) Appl. No.: 09/364,641

(22) Filed: Jul. 30, 1999

(51) Int. Cl.$^7$ .................................. C02F 3/00; C02F 9/00
(52) U.S. Cl. .................. 210/603; 210/631; 210/757; 210/803; 210/804
(58) Field of Search ................................ 210/803, 804, 210/800, 603, 757, 631

(56) References Cited

U.S. PATENT DOCUMENTS

| | | | |
|---|---|---|---|
| 1,160,918 | * | 11/1915 | Linden .................................. 210/803 |
| 2,867,945 | * | 1/1959 | Gotaas . |
| 3,462,360 | * | 8/1969 | McKinney . |
| 3,839,198 | * | 10/1974 | Shelef . |
| 3,930,999 | * | 1/1976 | Rosenquest, Jr. ...................... 210/19 |
| 4,839,052 | * | 6/1989 | Maree .................................. 210/603 |
| 4,976,875 | * | 12/1990 | Ryynanen ............................ 210/803 |
| 5,035,807 | * | 7/1991 | Maree .................................. 210/711 |
| 5,587,079 | * | 12/1996 | Rowley ................................ 210/603 |
| 5,616,241 | * | 4/1997 | Khudenko ............................ 210/151 |
| 5,695,655 | * | 12/1997 | Smati .................................. 210/803 |

FOREIGN PATENT DOCUMENTS

WO 97/29055 * 8/1997 (WO) .............................. C02F/3/34

* cited by examiner

Primary Examiner—Chester T. Barry
(74) Attorney, Agent, or Firm—James Ray & Associates

(57) ABSTRACT

A process for treating sulphate- and metal-containing waste water comprises adding a sulphide compound to the waste water. The sulphide compound reacts with a metal in the waste water to form a corresponding metal sulphide, which precipitates from the waste water. The precipitated metal sulphide is separated from the waste water, to obtain sulphate-containing waste water, which is subjected to biological sulphate reduction in which sulphates in the waste water are converted to sulphides.

18 Claims, 1 Drawing Sheet

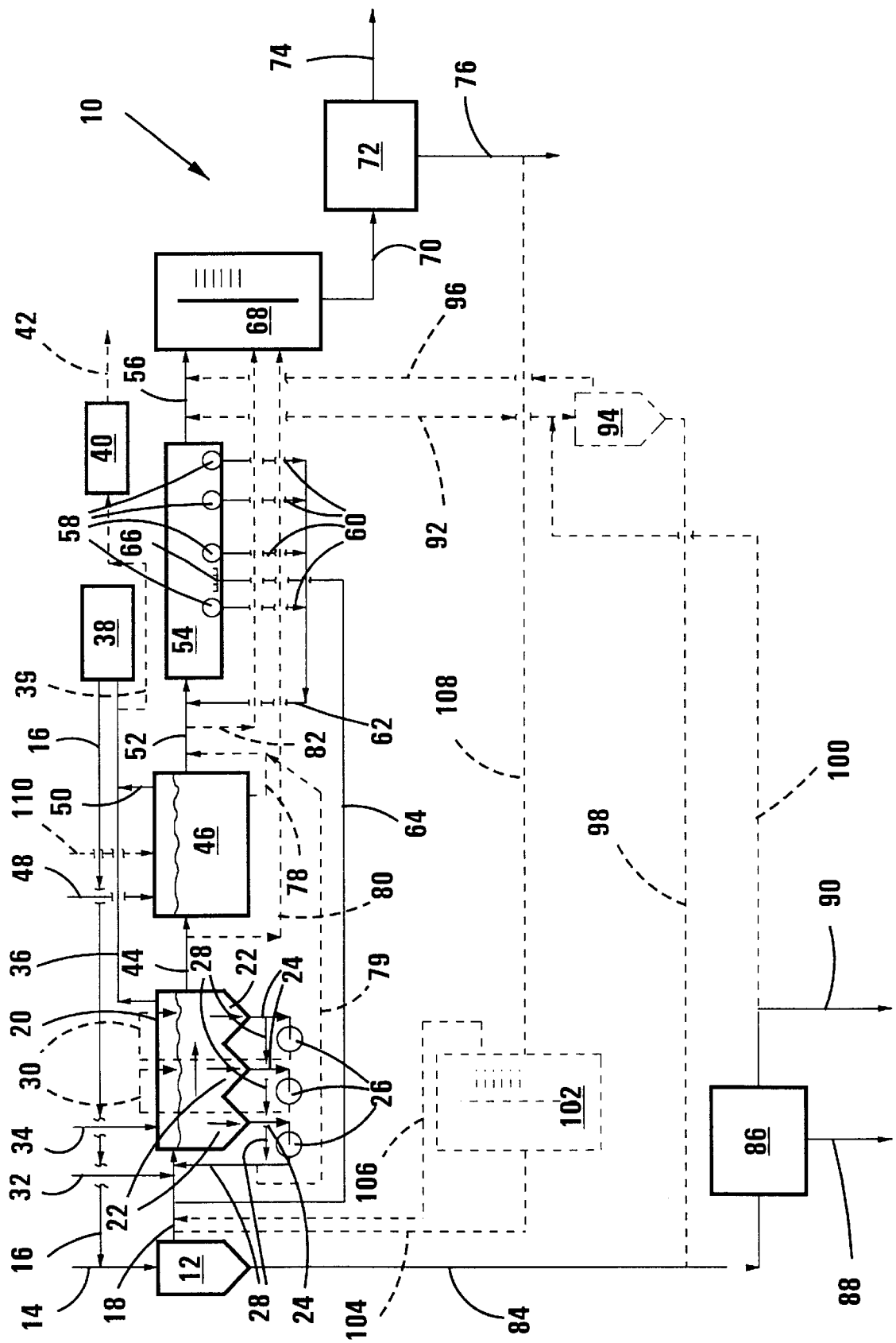

TREATMENT OF WATER

THIS INVENTION relates to the treatment of water. More particularly, the invention relates to the treatment of waste water. Still more particularly, the invention relates to a process for treating sulphate- and metal-containing waste water, and to a process for treating sulphate-containing waste water.

According to a first aspect of the invention, there is provided a process for treating sulphate- and metal-containing waste water, which process comprises adding a sulphide compound to the waste water, with the sulphide compound reacting with at least one metal in the waste water to form a corresponding metal sulphide and with the metal sulphide precipitating from the waste water;

separating the precipitated metal sulphide from the waste water, to obtain sulphate-containing waste water; and subjecting the sulphate-containing waste water to biological sulphate reduction in which sulphates in the waste water are converted to sulphides.

The sulphate- and metal-containing waste water may be mine effluent or waste water containing dissolved heavy metal cations, such as ferrous cations, and dissolved sulphate anions. Instead, however, the waste water can be any other dissolved sulphate- and metal-containing waste water. These waste waters may also be acidic.

The sulphide compound may be in liquid or gaseous form. For example, it may be hydrogen sulphide.

The separation of the precipitated metal sulphides from the waste water may be effected in a separation stage, which may comprise a settler.

The biological sulphate reduction may be effected in a reaction stage. A metabolizable carbon source may be added to the waste water in and/or before the reaction stage to form a waste water mixture having a solids component and a liquid component, with the carbon source being metabolized by organisms involved in the biological sulphate reduction. The metabolizable carbon source may comprise an organic carbon source which exhibits a high chemical oxygen demand ('COD'). In particular, the organic carbon source may be an effluent or waste product comprising organic material dissolved, suspended and/or carried in waste water, such as sewage, settled sewage, settled sewage solids, tannery waste water, brewery waste water, starch manufacture waste water, and paper pulp waste water. Such waste waters provide metabolizable organic carbon and the necessary organisms for biological sulphate reduction in the reaction stage.

The reaction stage may, in particular, comprise an accelerated hydrolysis reactor in which, as the waste water containing the carbon source passes through the reactor, e.g., from one end thereof to the other, hydrolysis of the solids component thereof into non-digestible COD material or RefCOD material; slowly digestible COD material or SBCOD material, and readily biodegradable COD material or RBCOD material, takes place. The RefCOD and SBCOD material may have a larger particle size than the RBCOD material, which typically has a particle size of the order of about 0.1 $\mu$m or less. The RefCOD and SBCOD material settles to the bottom of the reactor as the waste water passes through the reactor, while the RBCOD material is withdrawn from the reactor with the waste water. The waste water from the reactor may be subjected to polishing, in a polishing stage, e.g., to remove nitrogen and phosphorus therefrom.

The accelerated hydrolysis reactor may comprise, at or in its bottom or base, a plurality of valleys in which the settled material collects. The settled material may be recycled, preferably with shearing thereof, to the reactor. The shearing may be by means of a pump, e.g., a high shear pump. In this fashion, in addition to the hydrolysis of the solids component, fractionation of the RefCOD and SBCOD material, into RBCOD material, occurs.

Typically, the accelerated hydrolysis reactor may comprise three of the valleys. The settled material from each of the valleys may be recycled to the inlet end of the reactor. Instead, however, the settled material of the second and third valleys can be recycled to the reactor downstream of its inlet end, e.g., to above the second and third valleys respectively.

At least one sulphide compound will normally be formed in the accelerated hydrolysis reactor during the hydrolysis of the solids component. The process may thus include removing this sulphide compound from the accelerated hydrolysis reactor. At least one of the sulphide compounds which is formed may be gaseous hydrogen sulphide which will thus collect in a head space of the reactor. The removal of the hydrogen sulphide from the reactor may then include purging the head space with an inert gas, such as nitrogen, and withdrawing a combined hydrogen sulphide/inert gas gas stream from the reactor head space. The hydrogen sulphide may then optionally be recovered from this gas stream. The recovered hydrogen sulphide can then typically be used as the sulphide compound required for precipitation of the metal from the raw waste water. Instead, if desired, the gas stream can be subjected to sulphide oxidation, thereby to obtain sulphur as a product.

While the waste water from the accelerated hydrolysis reactor, and which contains the RBCOD material, can be directly subjected to the polishing, it may instead pass through a further reactor in which it is subjected to further biological sulphate reduction, i.e., further biological conversion of sulphates to sulphides. Further settling of solid material can also take place in this reactor. This reactor may also be subjected to hydrogen sulphide removal, e.g., by means of a nitrogen or other inert gas purge, as hereinbefore described for the accelerated hydrolysis reaction. The further reactor may comprise a baffle reactor, a UASB (upflow-anaroebic-sludge-blanket) reactor, an expanded bed granular reactor, a stirred reactor, or the like.

The waste water, before being subjected to the polishing, may also pass through an elongated trench reactor wherein any residual settleable material can settle out, and wherein further biological sulphate reduction can be effected, if necessary. It will be appreciated that the waste water from the accelerated hydrolysis reactor can, instead of passing to the further reactor as hereinbefore described, pass directly to the trench reactor.

The elongated trench reactor typically has a depth of 2–6 m, a width of 10–30 m, and a length of up to one or more kilometers, e.g., 1–4 km. The waste water enters one end of the trench reactor, passes along the trench reactor, and is withdrawn at its other end. A series of pumps may be associated with the trench, with the pumps being spaced apart along its length. Each pump may be arranged to recycle waste water and sediment from the bottom of the trench reactor in an upstream direction relative to the flow of waste water along the reactor. This will keep the bacterial population in the reactor in continuous movement. Thus, each pump is associated with a flow line along which it pumps waste water and sediment, the flow line having an inlet from the trench reactor and an outlet which is upstream of the inlet. All the outlets may be located in proximity to the waste water inlet end of the trench reactor. The trench reactor may thus be as described in ZA 98/3970 or AU 65949/98 which both claim priority from ZA 97/4165, and which are hence incorporated herein by reference, or a modification thereof. For example, when the trench reactor is in accordance with that described in ZA 98/3970/AU 65949/98, i.e., having a membrane extending along its length and across its width at a level below the tops of its side walls, the membrane dividing the trench into a lower sulphate reduction chamber below the membrane and in which the flow line inlets are located, and an upper waste water polishing chamber above the membrane, with the chambers being in hydraulic communication along the length of the trench at opposite side edges of the membrane, the polishing stage may thus be provided by the upper chamber above the membrane.

However, in a modification of the trench reactor of ZA 98/3970/AU 65949/98, the process may include feeding sulphate-containing waste water through at least one diffuser located at or near the bottom of the reactor, thereby to keep the sediment in the bottom of reactor in a stage of expansion. The sulphate-containing waste water may be a slipstream of the waste water which passes from the settler to the accelerated hydrolysis reactor.

The polishing may be effected in a high rate algal pond. Instead any other suitable polishing apparatus for nitrogen, e.g., in a form of nitrates, and phosphorus, e.g., in the form of phosphates, removal can be used.

The process may include subjecting the polished waste water to harvesting to harvest or collect biomass present in the waste water.

The process may include, if desired, subjecting at least a portion of the sulphate-containing waste water to biologically derived alkalization to increase its pH, prior to the waste water passing into the accelerated hydrolysis reactor. The alkalization may be effected in a stress reactor, which may comprise a high rate algal pond. If desired, at least a portion of the biomass harvested in the harvesting stage may be fed into the stress reactor to provide algal biomass required for the alkalization in the stress reactor.

If desired, the waste water from the accelerated hydrolysis reactor may be subjected to settling to remove any further metal sulphides which are present therein. This settling will thus be effected in a further settling stage. These metal sulphides may then, together with the metal sulphides from the initial settler, be subjected to reduction to recover metal cations and sulphur, which can be withdrawn as a product. The metal cations can be recycled to the waste water between the reactor, or the final reactor, and the further settling stage.

According to a second aspect of the invention, there is provided a process for treating sulphate-containing waste water, which process comprises
    subjecting, in a hydrolysis reaction stage, a waste water containing a carbon source and having a solids component and a liquid component, to hydrolysis so that the solids component thereof is hydrolyzed into non-digestible COD material or RefCOD material; slowly digestible COD material or SBCOD material, and readily biodegradable COD material or RBCOD material, with the RefCOD and SBCOD material having a larger particle size than the RBCOD material and the RefCOD and SBCOD material settling to the bottom of the reactor as the waste water passes through the reactor, and with the RBCOD material being withdrawn from the reactor with the waste water;
    passing the waste water from the hydrolysis reaction stage into a further reaction stage;
    adding a sulphate-containing waste water to the further reaction stage;
    subjecting the sulphate-containing waste water to biological sulphate reduction in the further reaction stage; and
    withdrawing treated waste water from the further reaction stage.

The hydrolysis reaction stage may comprise an accelerated hydrolysis reactor. The accelerated hydrolysis reactor may thus substantially be as hereinbefore described, save that it functions by way of fresh water hydrolysis, rather than sulphate-containing water hydrolysis.

The accelerated hydrolysis reactor may, as hereinbefore described, comprise, at or in its bottom or base, a plurality of valleys in which the settled material collects, with the settled material being recycled, with shearing, to the reactor so that, in addition to the hydrolysis of the solids component, fractionation of the RefCOD and SBCOD material, into RBCOD material, occurs.

The further reaction stage may be as hereinbefore described, and the waste water from the further reaction stage may be subjected to treatment in a trench reactor, polishing, etc, as hereinbefore described.

The invention will now be described in more detail with reference to the accompanying diagrammatic drawing of a process according to the invention for treating waste water.

In the drawing, reference numeral 10 generally indicates a process for treating waste water.

The process 10 comprises a settler 12 with a waste water feed line 14 leading into the settler 12. A hydrogen sulphide addition line 16 leads into the waste water feed line 14. If desired, a mixing stage (not shown) may be provided at the junction of the lines 14, 16.

A waste water line 18 leads from the settler 12 to an accelerated hydrolysis reactor 20. The hydrolysis reactor 20 typically comprises, at its bottom, three valleys 22 which are staggered in the direction of water flow through the reactor. However, a greater or lesser number of valleys 22 can be provided if desired. A sediment withdrawal line 24 leads from each valley 22 to a high shear pump 26, with a discharge line 28 leading from each pump 26 to the flow line 18. Instead, however, the pumps 26 associated with the second and third valleys can have discharge lines 30, indicated in broken line, leading back into the reactor 20 above or ahead of the respective valleys.

An organic carbon, e.g., sewage, addition line 32 leads into the waste water line 18 ahead of the reactor 20.

A nitrogen addition line 34 leads into the top of the reactor 20, with a gaseous stream withdrawal line 36 leading from the top of the reactor to a separation stage 38. The hydrogen sulphide line 16 leads from the stage 38. However, if desired, instead of the stage 38, a sulphide oxidation stage 40 can be provided, with a gaseous stream line 39 then leading from the line 36 into the stage 40, and a sulphur withdrawal line 42 then leading from the sulphur oxidation stage 40.

A waste water line 44 leads from the reactor 20 to a further reactor 46 which may be in the form of a baffle reactor, a UASB reactor, an expanded bed granular reactor or a stirred tank. A nitrogen addition line 48 also leads to the top of the reactor 46, with a gaseous stream withdrawal line 50 leading from the reactor 46 into the line 36.

A waste water line 52 leads from the reactor 46 to an elongate trench reactor 54. The line 52 thus leads into one end of the trench 54, while a waste water line 56 leads from the other end of the trench 54. Along its length, the trench 54 is provided with a plurality of sludge or sediment withdrawal pipes 58, from each of which leads a conduit 60. The conduits 60 lead into a return conduit 62 leading into the waste water conduit 52 upstream of the reactor 54. It will be appreciated that one or more of the conduits 60, and/or the conduits 62, may be provided with a suitable pump.

A flow line 64 leads from the flow line 18 to at least one distributor or diffuser 66 provided in the bottom of the reactor 54. In use, water entering through the distributor 66 will serve to provide an additional sulphate source to the sludge which collects at the bottom of the reactor 54.

The line 56 leads to a high rate algal pond 68, with a line 70 leading from the pond 68 to a harvesting stage 72. A water withdrawal line 74 leads from the harvesting stage 72, as does a biomass withdrawal line 76.

An optional sludge transfer line 78 leads from the bottom of the reactor 46, into the flow line 52, as does an optional sediment transfer line 79 which leads from the valleys 22 of the reactor 20.

In one embodiment of the invention, the reactors 46, 54 can be dispensed with. A flow line 80 will then lead directly from the flow line 44 to the high rate algal pond 68.

In another embodiment of the invention, the reactor 46 may be present; however, the reactor 54 can then be dispensed with. A flow line 82 will then lead directly from the flow line 52 to the high rate algal pond 68.

A metal sulphide withdrawal line 84 leads from the settler 12 to a metal sulphide reduction stage 86. The sulphide withdrawal line 88 leads from the stage 86, as does a metal cation withdrawal line 90.

If desired, a waste water line 92 may lead from the line 56 to a second settler 94, with a waste water return line 96 leading back to the flow line 56. A metal sulphate withdrawal line 98 then leads from the bottom of the settler 94 to the metal sulphide line 84. A metal ion transfer line 100 can then lead from the metal cation withdrawal line 90 to the waste water flow line 92.

The process 10 may also optionally include an alkalization stage 102. When the stage 102 is present, a waste water flow line 104 will then lead from the waste water line 18 to the stage 102, with a waste water return line 106 leading from the stage 102 back to the flow line 18. The stage 102 may then comprise a stress reactor, typically a high rate algal pond. A biomass addition line 108 may then lead from the biomass recovery line 76 to the stage 102.

In use, acidic mine water containing dissolved sulphate anions and metal, e.g., ferrous, cations passes along the flow line 14 into the settler 12. Hydrogen sulphide is added thereto along the line 16. Metal sulphide precipitates out in the settler 12, and is withdrawn along the line 84. Metal sulphide-lean waste water, which still contains sulphate anions, passes into the accelerated hydrolysis reactor 20. Organic carbon is added to the waste water along the line 32. The organic carbon thus provides a metabolizable carbon source. In the reactor 20, the waste water moves horizontally from one end of the reactor to the other, while flocs of solid matter settle into the valleys 22. The solids comprise RefCOD material, SBCOD material and RBCOD material. The RBCOD material is approximately 0.1 $\mu$m in size, or smaller, and exits the reactor 20 with the waste water, along the line 44.

The RefCOD and SBCOD material settles into the valleys 22, is withdrawn along the lines 24, passes through the pumps 26, and is recycled by means of the lines 28 to the reactor 20. Thus, in the reactor 20, there is hydrolysis of the solid and floc material into RefCOD, SBCOD and RBCOD material, together with fractionation of the RefCOD and SBCOD material into RBCOD material. Additionally, sulphate reduction is effected in the reactor 20.

A nitrogen purge enters the top of the reactor 20 along the line 34 and purges hydrogen sulphide which collects in the head space of the reactor 20. A gaseous stream comprising nitrogen and hydrogen sulphide passes along the line 36 to the hydrogen sulphide recovery stage 38, with the hydrogen sulphide which is thus recovered passing along the line 16. As indicated hereinbefore, the stage 38 can be omitted, if desired, with the hydrogen sulphide along the line 16 then being taken from an external source. The nitrogen/hydrogen sulphide gas stream from the reactor 20 will then pass along the flow line 39 into a sulphide oxidation stage 40, with sulphur being recovered from the stage 40 along the flow line 42.

The RBCOD-containing waste water from the stage 20 passes along the flow line 44 into the reactor 46. Nitrogen also enters the head space of the reactor 46 along the flow line 48, with a hydrogen sulphide/nitrogen gaseous mixture being withdrawn from the reactor 46 along the flow line 50 which leads into the flow line 36.

In the reactor 46, further biological reduction of sulphates takes place. The reactor 46 also acts as a settler for settleable material, some of which can optionally be withdrawn from the bottom of the reactor along the line 78 and added back to the waste water withdrawn from the reactor 46 along the line 52. Some of the sludge from the accelerated hydrolysis reactor 20 can also be fed to the trench reactor 54, along the flow line 79, if desired.

The waste water passing along the line 52 contains substantially no metal such as iron, and no sulphates. It can, however, contain undigested particulates.

The waste water from the reactor 46 passes into the trench reactor 54 which permits any residual settleables to settle out in the bottom of the reactor. This material is withdrawn through the conduits 58, 60 and recycled along the conduit 62. The sludge in the reactor 54 is kept in the state of expansion by means of sulphide-containing waste water which enters the bottom of the reactor through the distributor 66.

Further sulphate reduction, if there are still sulphates present in the water entering the reactor 54, can take place in the reactor 54.

Waste water from the trench reactor 54 passes along the flow line 56, into the high rate algal pond 68, where final polishing of the waste water, eg for nitrate and phosphate removal therefrom, takes place. The polished water is withdrawn from the high rate algal pond 68 along the flow line 70, to the harvesting stage 72. Treated waste water is withdrawn from the harvesting stage 72 along the flow line 74, and biomass, which can be used for aqua culture, being withdrawn along the line 76.

The metal sulphide which settles out in the settler 16 is withdrawn along the line 84 and passes to a reduction stage 86, with sulphur being withdrawn from the stage 86 along the line 88, and metal cations being withdrawn along the line 90.

If the optional further settler 94 is provided, at least a portion of the waste water from the trench reactor 54 will pass into the settler along the line 92. Metal sulphate which has precipitated out is withdrawn along the line 98, with metal cations being added to the waste water entering the settler 94, along the line 100. Waste water is returned from the settler 94 to the high rate algal pond 68, along the flow line 96.

When the optional alkalization stage 102 is provided, then at least a portion of the waste water from the settler 12 passes, along the flow line 104, to the stage 102, with waste water, having higher alkalinity, being returned along the line 106. Algal biomass in the stage 102, which is required for alkalization of the waste water, is augmented by biomass from the stage 72, which is fed into the stage 102 along the line 108.

Thus, the products from the process 10 are sulphur, useful biomass, and treated waste water. Additionally, ferric cations can also be produced. Still further, the process results in the disposal of a waste product, e.g., sewage.

In another embodiment of the invention, instead of feeding sulphate-containing waste water into the reactor 20 along the line 18, fresh water hydrolysis of sewage entering the stage 20 along the line 32, can be effected. In such case, a source of sulphate cations, such as acidic sulphate-containing mine water, is then added to the reactor 46 along a flow line 110. The trench reactor 54, high rate algal pond 68 and harvesting stage 72 will then be used in conjunction with the reactor 46 and the hydrolysis reactor 20, in substantially the same fashion as hereinbefore described.

What is claimed is:

1. A process for treating sulphate- and metal-containing waste water, which process comprises adding a sulphide compound to the waste water, with the sulphide compound reacting with at least one metal in the waste water to form a corresponding metal sulphide and with the metal sulphide precipitating from the waste water;

separating the precipitated metal sulphide from the waste water, to obtain a sulphate containing waste water;

adding a metabolizable carbon source to the waste water to form a waste water mixture having a solids component and a liquid component; and subjecting the waste water mixture to biological sulphate reduction in which sulphates in the waste water are converted to sulphides and during which the carbon source is metabolized by organisms involved in the biological sulphate reduction, with the biological sulphate reduction being effected in a hydrolysis reaction stage in which, as the waste water mixture passes through the reaction stage, hydrolysis of the solids component thereof into non-digestible COD material ("RefCOD material"), digestible COD material ("SBCOD material"), and biodegradable COD material ("RBCOD material") take place, the RefCOD and SBCOD material having a larger particle size than the RBCOD material, and with the RefCOD and SBCOD material settling out;

withdrawing waste water, together with the RBCOD material, from the reaction stage; and recycling the settled RefCOD and SBCOD material, with shearing, to the hydrolysis reaction stage so that, in addition to the hydrolysis of the solids component, fractionation of the RefCOD and SBCOD material, into RBCOD material, occurs.

2. A process according to claim 1, wherein the sulphate- and metal-containing waste water is mine effluent or waste water containing dissolved heavy metal cations, and dissolved sulphate anions, with the sulphide compound which is added being hydrogen sulphide.

3. A process according to claim 1, wherein the biological sulphate reduction is effected in a reaction stage, with a metabolizable carbon source being added to the waste water in and/or before the reaction stage to form a waste water mixture having a solids component and a liquid component, with the carbon source being metabolized by organisms involved in the biological sulphate reduction.

4. A process according to claim 3, wherein the metabolizable carbon source is an effluent or waste product comprising organic material dissolved, suspended and/or carried in waste water, and is selected from the group consisting of sewage, settled sewage, settled sewage solids, tannery waste water, brewery waste water, starch manufacture waste water and paper pulp waste water.

5. A process according to claim 1, wherein the hydrolysis reaction stage comprises an accelerated hydrolysis reactor having, at on in its bottom or base, a plurality of valleys in which the settled material collects, and from which it is withdrawn for recycling and with the waste water from the reactor being subjected to polishing.

6. A process according to claim 5, wherein at least one sulphide compound is formed in the accelerated hydrolysis reactor during the hydrolysis of the solids component, with this sulphide compound being removed from the accelerated hydrolysis reactor.

7. A process according to claim 6, wherein the sulphide compound which is formed is gaseous hydrogen sulphide which collects in a head space of the reactor, with the removal of the hydrogen sulphide from the reactor including purging the head space with an inert gas and withdrawing a combined hydrogen sulphide/inert gas stream from the reactor head space, with hydrogen sulphide then optionally being recovered from this gas stream.

8. A process according to claim 5, wherein the waste water from the accelerated hydrolysis reactor, and which contains the RBCOD material, passes through a further reactor in which it is subjected to further biological sulphate reduction.

9. A process according to claim 5, wherein the waste water, before being subjected to the polishing, passes through an elongated trench reactor wherein any residual settleable material settles out, and wherein further biological sulphate reduction is effected, if necessary.

10. A process according to claim 5, wherein the polishing is effected in a high rate algal pond.

11. A process according to claim 5, which includes subjecting the polished waste water to harvesting to harvest or collect biomass present in the waste water.

12. A process according to claim 11, which includes subjecting at least a portion of the sulphate-containing waste water to biologically derived alkalization to increase its pH, prior to the waste water passing into the accelerated hydrolysis reactor.

13. A process according to claim 12, wherein the alkalization is effected in a stress reactor comprising a high rate algal pond, and wherein at least a portion of the biomass harvested in the harvesting stage is fed into the stress reactor to provide algal biomass required for the alkalization in the stress reactor.

14. A process according to claim 5, wherein the waste water from the accelerated hydrolysis reactor is subjected to settling to remove any further metal sulphides which are present therein.

15. A process for treating sulphate-containing waste water, which process comprises subjecting, in a hydrolysis reaction stage, a waste water containing a carbon source and having a solids component and a liquid component, to hydrolysis so that the solids component thereof is hydrolyzed into non-digestible COD material ("RefCOD material"); digestible COD material ("SBCOD material"), and biodegradable COD material ("RBCOD material"), with the Ref COD and SBCOD material having a larger particle size than the RBCOD material and the RefCOD and SBCOD material settling as the waste water passes through the hydrolysis reaction stage, and with the RBCOD material being withdrawn from the hydrolysis reaction stage with the waste water;

recycling the settled RefCOD and SBCOD material, with shearing, to the hydrolysis reaction stage so that, in addition to the hydrolysis of the solids component, fractionation of the RefCOD and SBCOD material, into RBCOD material, occurs in the hydrolysis reaction stage;

passing the waste water from the hydrolysis reaction stage into a further reaction stage;

adding a sulphate-containing waste water to the further reaction stage;

subjecting the sulphate-containing waste water to biological sulphate reduction in the further reaction stage; and withdrawing treated waste water from the further reaction stage.

16. A process according to claim 15, wherein the hydrolysis reaction stage comprises an accelerated hydrolysis reactor having, at or in its bottom or base, a plurality of valleys, in which the settled material collects and from which it is withdrawn for recycling.

17. A process according to claim 15, wherein treated waste water from the further reaction stage passes through an elongate trench reactor wherein any residual settleable material settles out.

18. A process according to claim 15, wherein the treated waste water is subjected to polishing in a high rate algal pond, with the polished waste water being subjected to harvesting to harvest or collect biomass present in the waste water.

* * * * *